No. 792,558. PATENTED JUNE 13, 1905.
W. R. SMITH.
EXPANSION AND TRIPLE VALVE FOR COMPRESSED AIR BRAKES.
APPLICATION FILED AUG. 24, 1903.
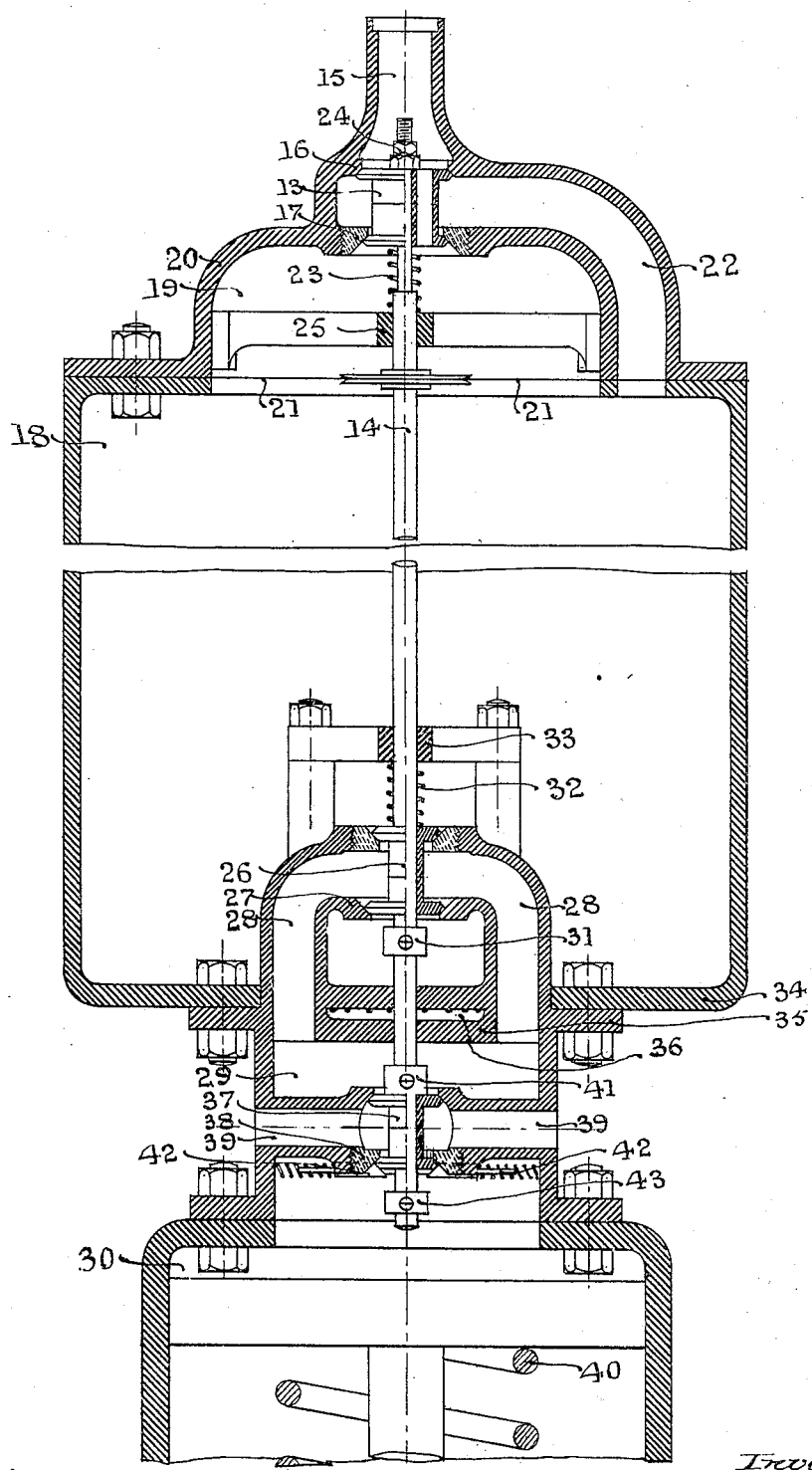

No. 792,558. Patented June 13, 1905.

UNITED STATES PATENT OFFICE.

WILLIAM ROSE SMITH, OF WEST NORWOOD, LONDON, ENGLAND, ASSIGNOR TO THOMAS HENRY PEARSE, OF LONDON, ENGLAND.

EXPANSION AND TRIPLE VALVE FOR COMPRESSED-AIR BRAKES.

SPECIFICATION forming part of Letters Patent No. 792,558, dated June 13, 1905.

Application filed August 24, 1903. Serial No. 170,509.

*To all whom it may concern:*

Be it known that I, WILLIAM ROSE SMITH, a subject of the King of Great Britain, residing at West Norwood, in the county of London, England, have invented an Improved Expansion and Triple Valve for Compressed-Air Brakes, of which the following description, in connection with the accompanying drawing, is a specification, like numerals on the drawing representing like parts.

My invention relates to triple valves for air-brakes, and taken in connection with the apparatus shown in my copending application, Serial No. 170,510, filed concurrently herewith, constitutes means for enabling the driver or engineer to stop a long train smoothly and easily and grade the pressure of the brake with the utmost nicety.

One of the leading features of my invention consists in having the three valves all operated on and by the same valve stem or spindle, the auxiliary reservoir and inlet-valve, outlet-valve, and brake-cylinder and valve all being arranged in proper alinement to permit of this construction. I employ a construction of sliding valves which permits them to operate dissimultaneously as required, although all actuated by the same spindle.

Various other features of my invention and the operation thereof will be pointed out in the course of the following description, reference being had to the accompanying drawing, in which I have illustrated one embodiment of the invention, and the latter will be further defined in the appended claims.

In the drawing my improved apparatus is shown in central longitudinal section, parts being broken away for convenience.

I have not deemed it necessary to show or indicate the entire system, but have confined the drawing and description to those features which are herein claimed, and I wish it understood that while I have shown and described the same in all constructional details many changes may be resorted to and substitutions made without departing from the spirit and scope of my invention.

The improved triple valve, in combination with the auxiliary reservoir and brake-cylinder, consists of three balanced double-beat valves on one spindle actuated longitudinally to open and close the valves, as required, by the variations of pressure of the compressed air on each side of a diaphragm of corrugated steel or leather or other flexible material.

The first double-beat valve 13 on the spindle 14 is situated in the junction of the main pipe 15, suitably enlarged to contain the valve-seats 16 17, and is used for charging the auxiliary reservoir 18 with compressed air at the same pressure as that contained in the main pipe. This valve is a hollow cylinder or pipe 13, leading from the main pipe into the chamber 19, formed by the conical cover or end 20 of the auxiliary reservoir and the diaphragm 21. A pipe 22 leads from the valve-casing between the two valve-seats 13 to the auxiliary reservoir 18, and a spiral compression-spring 23 supports the valve 13 on the spindle 14 against a nut, forming a stop on top of the valve, the lower end of the spring abutting on the upper spider-guide 25 of the valve-spindle to keep the valve 13 closed while the diaphragm 21 is in any position from horizontal upward, allowing nearly free movement of the diaphragm and valve-spindle upward for working the other two valves.

The second double-beat valve 26 is situated within the auxiliary reservoir 18, the casing 27 being supported on a pair of pipes 28, leading from between the two valve-seats to the third valve-chamber 29, formed in the end of the brake-cylinder 30. This valve 26 when opened by the movement of the diaphragm 21 upward above the horizontal on the lowering of the air-pressure in the main pipe 15 admits the compressed air from the auxiliary reservoir 18 into the brake-cylinder 30, thereby applying the brakes to the wheels of the carriage. The valve 26 slides on the spindle 14 and is lifted or opened by a stop 31 on the valve-spindle 14 and closed on the return of the spindle by a compression-spring 32 abutting on a second spider-guide 33 within the auxiliary reservoir. The valve-spindle passes through the end 34 of the auxiliary reservoir and the end 35 of the brake-cylinder, between which ends a small space 36 is left, communicating by holes in the cylinder with the atmosphere to take away any leakage of compressed air past the valve-spindle without raising the pressure accidentally in the brake-cylinder.

The third double-beat valve 37 is situated within a chamber 29 in the end of the brake-cylinder 30, the casing 37, supported by a pair of pipes 39, leading from between the two valve-seats 38 straight through the walls of the cylinder to the atmosphere. This valve 37 when opened by the movement of the diaphragm 21 downward below the horizontal on the increase of the air-pressure in the main pipe exhausts the compressed air from the brake-cylinder 30 to the atmosphere, thereby releasing the brakes by the powerful spring 40 within the cylinder driving back the brake-piston. The valve 37 slides on the spindle 14 and is opened by a stop 41 on the valve-spindle 14 and held open by a pair of spring-catches 42 on the lower side of the valve-seat until the valve-spindle travels upward again, when a stop 43 on the spindle on the lower side of the valve 37 closes the valve 37 just before the stop 31 for opening the second valve 26 reaches the second valve, and the same pair of spring-catches 42 keep the valve closed. The direct communication with the atmosphere from the brake-cylinder makes the release of the brakes absolutely unfailing and instantaneous.

The extent of time during which the second or supply valve to the brake-cylinder is opened, and thereby the rapidity and force with which the brakes are applied, depends upon the difference of pressure on the two sides of the diaphragm. For quick and powerful action, as required on emergencies, the pressure in the main pipe is suddenly lowered considerably by the equalizing driver's brake-valve handle being thrown suddenly over to the position marked "Emergency," opening the main pipe to direct communication with the atmosphere and letting the full pressure of the compressed air in the auxiliary reservoir into the brake-cylinder. The slight lowering of the air-pressure in the main pipe caused by the driver's valve in the position for ordinary applications applies the brakes with moderate force, the pressure being almost immediately balanced on both sides of the diaphragm and the valve closed, and the force of application is thus graduated by the duration of movement of the diaphragm so controlled by the driver's brake-valve.

The combined valves, reservoir, and brake-cylinder may be horizontal or vertical.

What I claim is—

1. In compressed-air brakes an improved quick-acting triple valve combined with each auxiliary reservoir and brake-cylinder, automatically controlled through the medium of the variations of pressure of air in the main pipe caused by the driver's brake-valve; consisting of three balanced double-beat valves on one spindle, actuated longitudinally to open and close the valves as required for applying or releasing the brakes, by the variation of pressure of the compressed air on each side of a diaphragm of corrugated steel, leather, or other flexible material as above described.

2. In an apparatus of the kind described, a main pipe, an auxiliary reservoir, a brake-cylinder, an outlet connection therefrom, a valve between said main pipe and reservoir, a valve between said reservoir and cylinder, a valve between said cylinder and outlet connection, a single common means for actuating said valves dissimultaneously, and means for the quick closing of said last-mentioned valve before the opening of the valve between the reservoir and cylinder.

3. In an apparatus of the kind described, a main pipe, an auxiliary reservoir, a brake-cylinder, an outlet connection therefrom, a valve between said main pipe and reservoir, a valve between said reservoir and cylinder, a valve between said cylinder and outlet connection, and a single spindle carrying all of said valves, a plurality of the latter being slidingly mounted on said spindle.

4. In an apparatus of the kind described, a main pipe, an auxiliary reservoir, a brake-cylinder, an outlet connection therefrom, a valve between said main pipe and reservoir, a valve between said reservoir and cylinder, a valve between said cylinder and outlet connection, a single spindle carrying all of said valves, the first-mentioned valves being positively moved thereby in opposite directions, and yielding means for moving said valves in a reverse direction.

5. In an apparatus of the kind described, a main pipe, an auxiliary reservoir, a brake-cylinder, an outlet connection therefrom, a valve between said main pipe and reservoir, a valve between said reservoir and cylinder, a valve between said cylinder and outlet connection, a single spindle for operating all of said valves, and means independent of said spindle for positively locking the last-mentioned valve.

6. In an apparatus of the kind described, a main pipe, auxiliary reservoir, brake-cylinder, outlet connection from the latter, and valves therefor, means for operating the valve for said outlet connection, and separate locking means for positively moving and retaining said valve in closed position.

7. In an apparatus of the kind described, a main pipe, auxiliary reservoir, brake-cylinder, outlet connection from the latter, and valves therefor, means for operating the valve for said outlet connection, said last-mentioned valve having a beveled edge, and yielding means for engaging said edge and crowding the valve into tightly-held closed position.

8. In an apparatus of the kind described, a main pipe, auxiliary reservoir, brake-cylinder, outlet connection from the latter, and valves therefor, means for operating the valve for said outlet connection, and separate yielding means for holding said valve in its extreme positions open and closed.

9. In an apparatus of the kind described, a main pipe, an auxiliary reservoir, a brake-cylinder, an outlet connection from the latter, valves therefor, all of said valves being slidingly mounted on a single spindle, means carried by said spindle for positively operating in one direction the valves from the main pipe and from the auxiliary reservoir, and means carried by said spindle for positively operating in both directions the valve from said brake-cylinder to said outlet connection.

10. In an apparatus of the kind described, a main pipe, an auxiliary reservoir of large capacity, a valve between the two, a brake-cylinder, a valve between said reservoir and cylinder, an outlet connection to the atmosphere, a valve therefor, and means for dissimultaneously operating said last-mentioned two valves.

11. In an apparatus of the kind described, a main pipe, an auxiliary reservoir, a diaphragm in the end of said reservoir, an inlet-pipe between said main pipe and reservoir independent of said diaphragm, a valve controlling said inlet, a chamber between said diaphragm and valve, said valve having a valve-stem fastened to said diaphragm, and said valve containing an opening affording free passage of air from said main pipe to said chamber.

12. In an apparatus of the kind described, a main pipe, an auxiliary reservoir, a brake-cylinder, a pipe from said reservoir to said brake-cylinder, a double-beat valve controlling the passage of air through said pipe from said reservoir, a chamber independent of said pipe opening on the opposite side therefrom of said double-beat valve, and a small outlet in said chamber to the outside atmosphere for preventing undue pressure in said chamber.

13. In an apparatus of the kind described, an auxiliary reservoir, a brake-cylinder, a valve between the two, an outlet-pipe from said brake-cylinder to the outside atmosphere, a valve therefor, and a single spindle carrying and dissimultaneously operating said two valves.

In witness whereof I have hereunto set my hand in the presence of two witnesses.

WILLIAM ROSE SMITH.

Witnesses:
T. Henry Pearse,
G. G. Harington.